(12) United States Patent
Zhou et al.

(10) Patent No.: US 11,626,912 B2
(45) Date of Patent: Apr. 11, 2023

(54) RANGE EXTENSION FOR COMMUNICATION SYSTEMS

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/353,162

(22) Filed: Jun. 21, 2021

(65) Prior Publication Data

US 2021/0314042 A1 Oct. 7, 2021

Related U.S. Application Data

(62) Division of application No. 16/356,843, filed on Mar. 18, 2019.

(Continued)

(51) Int. Cl.
*H04B 7/06* (2006.01)
*H04L 1/18* (2023.01)
(Continued)

(52) U.S. Cl.
CPC ......... *H04B 7/0617* (2013.01); *H04B 7/026* (2013.01); *H04B 7/0695* (2013.01); *H04B 7/155* (2013.01);
(Continued)

(58) Field of Classification Search
CPC ...... H04B 7/024; H04B 7/026; H04B 7/0617; H04B 7/0695; H04B 7/155; H04B 7/088;
(Continued)

(56) References Cited

U.S. PATENT DOCUMENTS

2011/0205955 A1   8/2011   Xu et al.
2011/0292875 A1   12/2011  Luo et al.
(Continued)

FOREIGN PATENT DOCUMENTS

WO   2016127412 A1   8/2016

OTHER PUBLICATIONS

International Search Report and Written—Opinion—PCT/US2019/022893—ISA/EPO—dated May 31, 2019.

(Continued)

*Primary Examiner* — Sophia Vlahos
(74) *Attorney, Agent, or Firm* — Patterson + Sheridan, L.L.P.

(57) ABSTRACT

A range extension method and apparatus for highly directional beams are disclosed. In one aspect, a first network node that is suitable for supporting mmWave transmissions to a wireless device such as a UE may extend the range of at least one transmit beam to a UE by selecting a suitable repetition configuration that transmits repetition versions of an original signal. The first network node sends information about the repetition configuration to a second network node which can transmit a portion of the repetition configuration information to the UE using sub-6 GHz transmissions. The UE can configure a receive beam to receive mmWave communications from the first network node by using the portion of the repetition configuration information received from the second network node.

22 Claims, 9 Drawing Sheets

Related U.S. Application Data

(60) Provisional application No. 62/645,115, filed on Mar. 19, 2018.

(51) Int. Cl.
   | | | |
   |---|---|---|
   | *H04B 7/155* | (2006.01) | |
   | *H04B 7/026* | (2017.01) | |
   | *H04B 7/08* | (2006.01) | |
   | *H04B 7/26* | (2006.01) | |

(52) U.S. Cl.
   CPC ............... *H04L 1/18* (2013.01); *H04B 7/088* (2013.01); *H04B 7/2606* (2013.01)

(58) Field of Classification Search
   CPC ......... H04B 7/2606; H04L 1/08; H04L 1/189; H04L 1/18; H04W 56/0015
   See application file for complete search history.

(56) References Cited

U.S. PATENT DOCUMENTS

| | | | | |
|---|---|---|---|---|
| 2013/0223487 | A1* | 8/2013 | Zhou | ............... H04L 25/02 375/219 |
| 2013/0315325 | A1* | 11/2013 | Wang | ............... H04B 7/0697 375/267 |
| 2014/0177607 | A1 | 6/2014 | Li et al. | |
| 2016/0007371 | A1 | 1/2016 | Pietraski et al. | |
| 2016/0134352 | A1* | 5/2016 | Stirling-Gallacher | ............... H04B 7/0639 370/329 |
| 2016/0323756 | A1 | 11/2016 | Shen et al. | |
| 2017/0265187 | A1 | 9/2017 | Chen et al. | |
| 2018/0070341 | A1 | 3/2018 | Islam et al. | |
| 2018/0131472 | A1 | 5/2018 | Xi et al. | |
| 2018/0139774 | A1 | 5/2018 | Ma et al. | |
| 2018/0309495 | A1 | 10/2018 | Xiong et al. | |
| 2018/0309496 | A1 | 10/2018 | Lee et al. | |
| 2018/0323850 | A1* | 11/2018 | Baligh | ............... H04W 48/12 |
| 2018/0375556 | A1 | 12/2018 | Wang et al. | |
| 2019/0044601 | A1* | 2/2019 | Chang | ............... H04B 7/0695 |
| 2019/0288757 | A1 | 9/2019 | Zhou et al. | |

OTHER PUBLICATIONS

International Preliminary Report on Patentability—PCT/US2019/022893, The International Bureau of WIPO—Geneva, Switzerland, dated Oct. 1, 2020.

* cited by examiner

Possible symbol location patterns for PBCH with 5x repetition.

Tx Beam 710  Tx Beam 720  Tx Beam 730    Tx Beam

| Original Signal | Repetition 1 | Repetition 2 | ••• | Repetition N |
|---|---|---|---|---|

Rx Beam 715  Rx Beam 725  Rx Beam 735    Rx Beam

Tx Beam 750  Tx Beam 760  Tx Beam 770  Tx Beam

| Original Signal | Repetition 1 | Repetition 2 | ••• | Repetition N |

Rx Beam 755  Rx Beam 765  Rx Beam 775  Rx Beam

RANGE EXTENSION FOR COMMUNICATION SYSTEMS

CROSS-REFERENCE TO RELATED APPLICATION(S)

This application is a divisional of U.S. patent application Ser. No. 16/356,843, filed Mar. 18, 2019, which claims the benefit of and priority to U.S. Provisional Patent Application No. 62/645,115, filed Mar. 19, 2018. The contents of each of these applications are incorporated by reference in their entirety.

BACKGROUND

Field of the Disclosure

The following relates generally to wireless communication, and more specifically to range extension techniques in communication systems (e.g., millimeter wave communication systems).

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices (e.g., base stations, UEs, etc.) may communicate using directional signal transmission and reception (e.g., beams), in which beamforming techniques may be applied using one or more antenna elements to form a beam in a particular direction. For a beamformed transmission, the amplitude and phase of each antenna in an array of antennas may be precoded, or controlled to create a desired (e.g., directional) pattern of constructive and destructive interference in the wavefront. In such systems, a base station may schedule downlink or uplink transmissions for a UE on a set of resources, and the base station may then send and receive transmissions in a direction of the UE's scheduled transmission, for example, by forming a transmit beam in that direction.

The use of beamforming techniques is particularly useful in communication systems that operate over higher millimeter wave (mmWave) frequencies since mmWave communications are more vulnerable to adverse atmospheric conditions and physical propagation impediments. However, beamforming by itself may not be sufficient to fully compensate for the losses attributable to physical impediments such as walls and other common objects. Range extension of beams in the past has been focused on optimized antenna array geometries that adjust beam amplitudes. However, such solutions are not designed with the computational and power constraints of modern telecommunication devices in mind.

SUMMARY

The techniques described herein relate to methods, systems, devices and apparatus that extend the effective communication range of mmWave communication systems.

A method for range extension of highly directional beams from a first node to a second node in a communication system is described. The method may include determining to transmit a set of repetition versions of an original signal from the first node to the second node by at least one transmit beam of the first node, selecting repetition configuration information for the at least one transmit beam used by the first node for transmissions to the second node, configuring the at least one transmit beam in accordance with the repetition configuration information, and passing at least a portion of the repetition configuration information to a third node, the portion suitable for conveyance to the second node by the third node.

An apparatus for performing range extension of highly directional beams in a communication system is described. The apparatus may include a processor, a memory in communication with the processor, and instructions stored in the memory and executable by the processor to cause the apparatus to determine to transmit a set of repetition versions of an original signal from the first node to the second node by at least one transmit beam of the first node, select repetition configuration information for the at least one transmit beam used by the first node for transmissions to the second node, configure the at least one transmit beam in accordance with the repetition configuration information, and pass at least a portion of the repetition configuration information to a third node, the portion suitable for conveyance to the second node by the third node.

A method for using information from a first wireless device to aid in the reception of mmWave communications from a second wireless device is described. The method may include establishing communication sessions with the first wireless device and second wireless device, performing a beam management procedure with the second wireless device, receiving at least one repetition configuration information message from the first wireless device, using the contents of the at least one repetition configuration information message to configure one or more antenna arrays, and receiving transmissions from the second wireless device using the configured one or more antenna arrays.

A method performed at a first wireless device for facilitating range extension of highly directional beams originating from a second wireless device is described. The method includes establishing a first communication session with a third wireless device and a second communication session with the second wireless device, receiving a network message with repetition configuration information from the second wireless device, generating a message to the third wireless device using the repetition configuration information of the network message, and transmitting the repetition configuration information message to the third wireless device.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
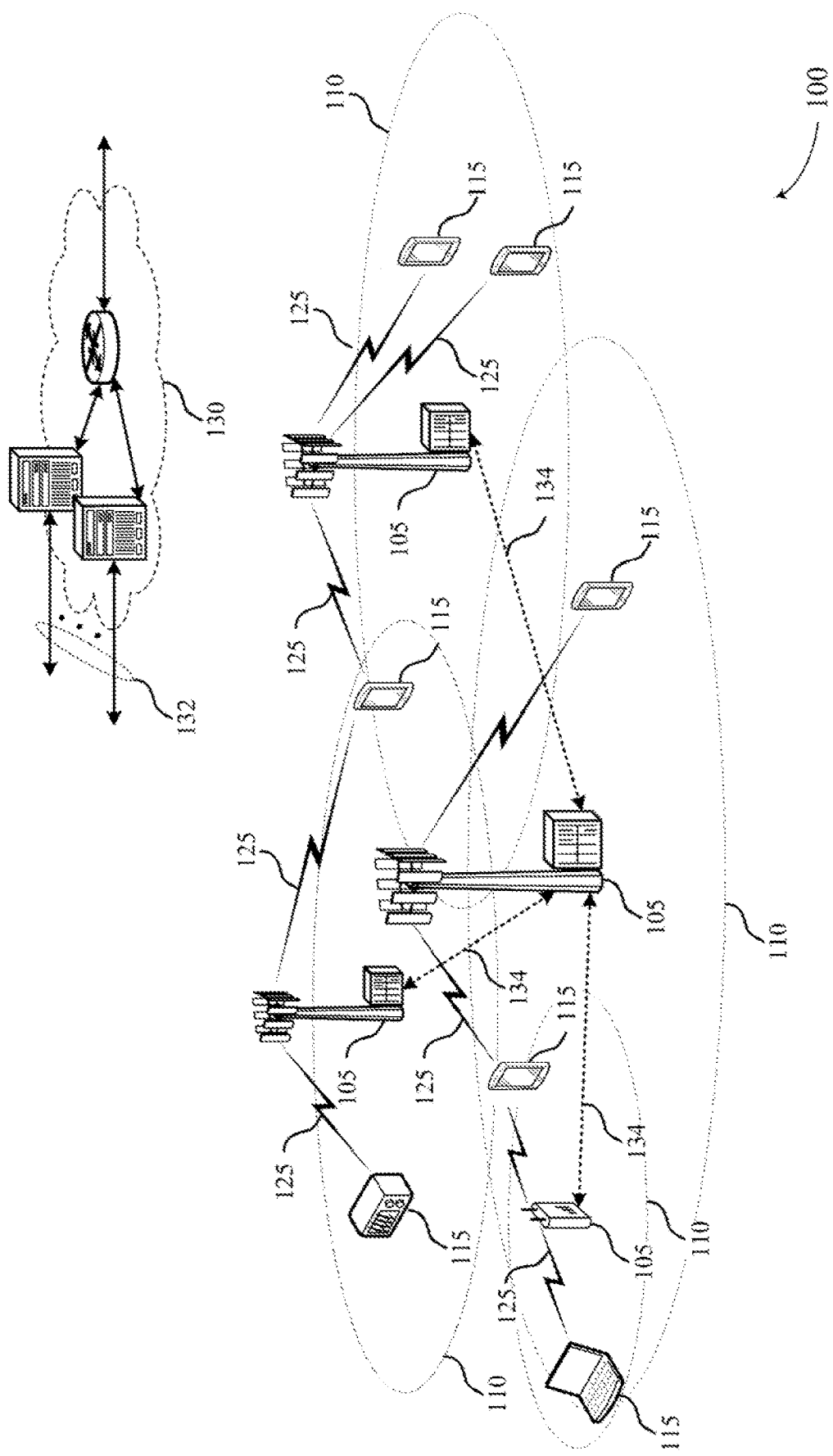
FIG. 1 illustrates an example of a wireless communications system in accordance with various aspects of the present disclosure.

Some wireless communication systems may operate in millimeter wave (mmWave) frequency ranges, e.g., 26 gigahertz (GHz), 30 GHz, 40 GHz, 60 GHz. It should be noted that though certain aspects are described with respect to mmWave frequency ranges, they may be applicable to wireless communication systems that use other frequency ranges. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via these directional beams (e.g., beamformed for transmission and reception using one or more antenna arrays at the wireless device). For example, a base station and a UE may communicate via beam pair links (BPLs), each BPL including a transmit beam of one wireless node (e.g. a base station) and a receive beam of a second wireless node (e.g., a UE). For this disclosure, a "wireless node" or "network node" may be referring generically to either a UE, a base station, or a cell of a base station depending upon context and interactions. More specific descriptions such as "UE" and "serving cell" may be used along with generic descriptions to clarify interactions between separate entities.

For mmWave systems that are susceptible to high path loss and penetration loss, the gains attributable to directional beamforming has been vital for supporting links between wireless devices. However, beamforming by itself may not be sufficient to fully compensate for the losses attributable to physical impediments such as walls and other objects. Range extension of beams in the past has been focused on optimized antenna array geometries that adjust beam amplitudes.

Range extension of uplink and downlink communications is possible through signal repetition techniques. Contents of a signal can be sent repetitively so that if portions of one signal are not received in their entirety, portions of a repeated version of the signal may be used to supplement the original signal and thereby reconstruct the transmitted signal contents. However, the use of beamforming in mmWave systems introduces technical hurdles for repetition procedures, namely, the presence of multiple beams corresponds to the presence of multiple decoding candidates. For a UE that is physically constrained to a limited number of antennas/antenna arrays and by power constraints, using blind decoding on an original signal received on one beam and repetitions of the original signal on the same or other beams would be time inefficient and power consuming due to the computational complexity of the various training and weighting algorithms involved in beamforming.

5G introduces a further level of complexity by envisioning wireless devices, both base stations and UEs, that support a large multiplicity of antennas and antenna arrays. For example, 5G is currently promulgating operational support for up to 64 antenna arrays at one wireless device, e.g., a base station, that may be used to communicate with another wireless device, e.g. a UE, that may be mobile. To support such communications, a base station may configure multiple sets of resources that are specific to one or more base station receive beams. These sets of beam-specific resources may be configured to be associated (e.g., quasi co-located (QCL)) with a reference signal, such as a channel state information reference signal (CSI-RS), a synchronization signal block (SSB), or the like.

A QCL association between a set of resources and a reference signal may correspond to the same or similar base station transmit beam(s) for transmitting the reference signal and corresponding base station receive beams for receiving uplink transmissions. Accordingly, a QCL association may also refer to a QCL relationship between antenna ports. Two antenna ports (or two sets of antenna ports) may be said to be QCL, spatially QCL, or have a QCL relationship if properties of the channel over which a symbol on one antenna port is conveyed can be inferred from the channel over which a symbol on the other antenna port is conveyed. For example, if a measured value for a parameter (e.g., delay spread, Doppler spread, Doppler shift, average delay, spatial parameters, etc.) of the channel for a first antenna port (or set of antenna ports) is within a threshold value of a measured value for the parameter of the channel for a second antenna port (or set of antenna ports), then the two antenna ports (or two sets of antenna ports) may be considered QCL. That is, if a first signal is transmitted with a first antenna port that is QCL with a second antenna port used to transmit a second signal, then the first signal and the second signal may be communicated via the same transmit beam and receive beam (e.g., the same beam pair link).

This disclosure provides methods, systems, and apparatus to support range extension in communication systems that utilize highly directional beams. Range extension is enabled by using novel repetition procedures. Repetition procedures are described that account for information that would help a receiver determine at least the repetition number, time/frequency location per repetition, or QCL information across repetitions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB) for Long Term Evolution (LTE), a next-generation Node B or giga-nodeB (either of which may be referred to as a gNB) for fifth generation (5G) new radio (NR), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). Direct communications between base stations 105 may be conducted either wirelessly or through a conventional wired medium.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmWave) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. The UE 115 may further receive a master information block (MIB), which may be transmitted in the physical broadcast channel (PBCH). The MIB may contain system bandwidth information, a system frame number (SFN), and other system information that will enable decoding of other system channels. After decoding the MIB, the UE 115 may receive one or more remaining minimum system information that contain information such as cell access parameters and RRC configuration information related to random access channel (RACH) procedures, paging, PUCCH, physical uplink shared channel (PUSCH), power control, sounding reference signal (SRS), and cell barring. In some cases, a base station 105 may transmit synchronization signals (SSs) (e.g., PSS SSS, PBCH, and the like) as a block using multiple beams in a beam-sweeping manner through a cell coverage area.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic SRS and uplink DMRS for link adaptation and demodulation, respectively.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both. In some cases, a UE 115 may perform an LBT procedure prior to performing an AUL transmission.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Within the present disclosure, a frame may refer to a duration of 10 ms for wireless transmissions, with each frame consisting of 10 subframes of 1 ms each. Each 1 ms subframe may consist of one or more adjacent slots. In some examples, a slot may be defined according to a specified number of OFDM symbols with a given cyclic prefix (CP) length. For example, a slot may include 7 or 14 OFDM symbols with a nominal CP. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Downlink control information (DCI), including HARQ information, is transmitted in a physical downlink control channel (PDCCH) carries DCI in at least one control channel elements CCE, which may consist of nine logically contiguous resource element groups (REGs), where each REG contains 4 resource elements. DCI includes information regarding downlink scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI includes additional signaling information. DCI size and format depend on the amount of information as well as factors such as bandwidth, the number of antenna ports, and duplexing mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs))) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmWave receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Figure 2:
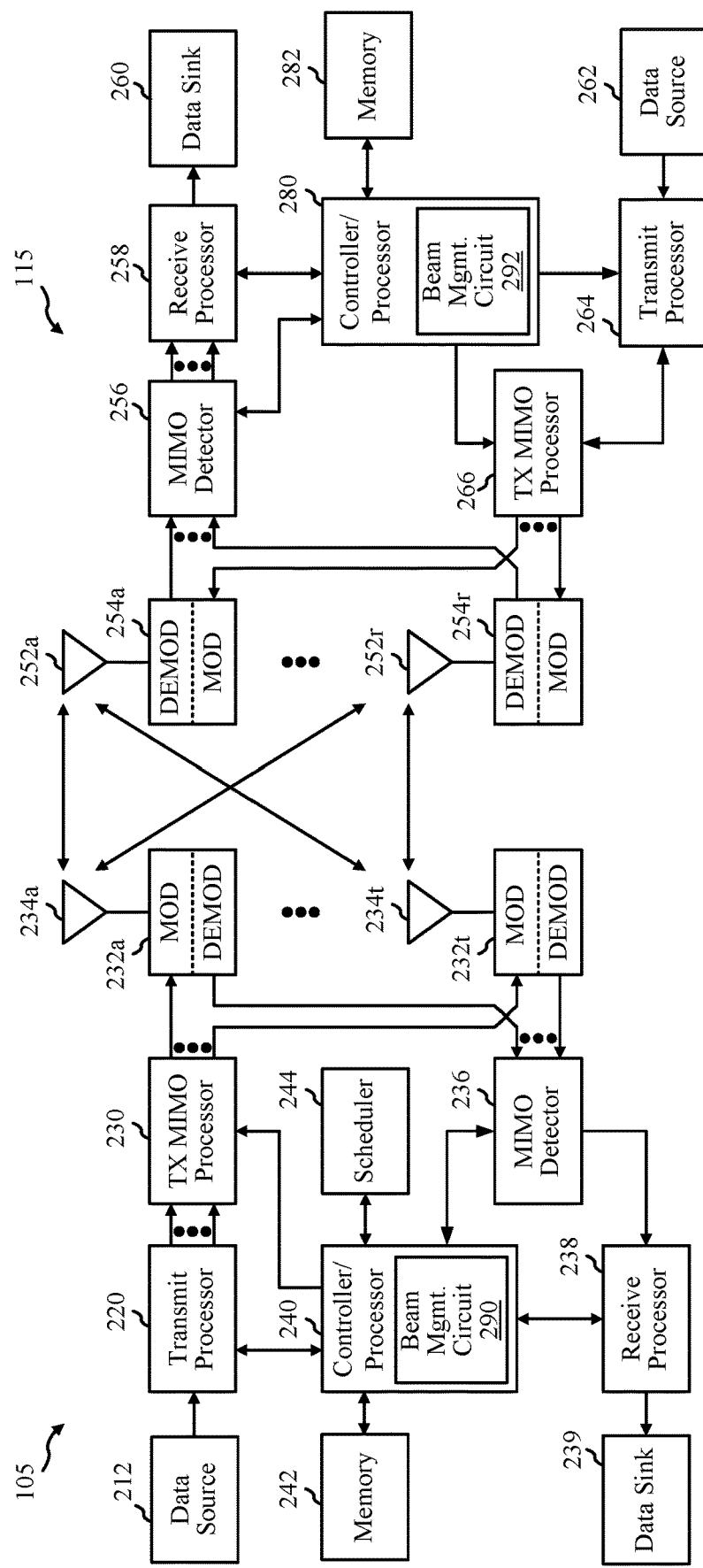
FIG. 2 is a block diagram of a design of a base station and user equipment (UE) in accordance with various aspects of the present disclosure

FIG. 2 is a block diagram of a design of a base station 105 (e.g., a serving cell and/or network node) and UE 115 of FIG. 1, according to certain aspects of the disclosure. Base station 105 may be equipped with T antennas 234a through 234t, and UE 115 may be equipped with R antennas 252a through 252r. For the purposes of clarity, the term "antenna" is used to be representative of either a singular antenna structure or an antenna array structure, and that the plural form of antenna may be representative of a plurality of singular antennas, a plurality of singular antennas and antenna arrays, or a plurality of antenna array structures without departing the scope of this disclosure.

At base station 105, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively. Transmission via T antennas 234a through 234t may be sent on transmit beams or omni-directionally.

At UE 115, antennas 252a through 252r may receive the downlink signals from base station 105 and/or other BSs and may provide received signals to demodulators (DEMODs) 254a through 254r, respectively. Antennas 252a through 252r may be configured to receive beamformed or omni-directional downlink signals. Each DEMOD 254 may condition (e.g., filter, amplify, down-convert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 115 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 115, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to base station 105. At base station 105, the uplink signals from UE 115 and other UEs may be received by antennas 234, processed by DEMODs 232, detected by a MIMO detector 236 if applicable, and further processed by a receive processor 238 to obtain decoded data and control information sent by UE 115. Processor 238 may provide the decoded data to a data sink 239 and the decoded control information to controller/processor 240. Base station 105 may include communication unit 244 and communicate to network controller 130 via communication unit 244. Network controller 130 may include communication unit 294, controller/processor 290, and memory 292.

Controllers/processors 240 and 280 may direct the operation at base station 105 and UE 115, respectively. For example, controller/processor 240 and/or other processors and modules at base station 105 may perform or direct operations and/or processes for techniques described herein. Similarly, controller/processor 280 and/or other processors and modules at UE 115 may perform or direct operations and/or processes for the techniques described herein (e.g., those illustrated in FIGS. 8-10). Memories 242 and 282 may store data and program codes for base station 105 and UE 115, respectively. A scheduler 246 may schedule UEs for data transmission on the downlink and/or uplink.

In some aspects of the disclosure, the controller/processor 240 may include beam management circuitry 290 configured for various functions, including, for example, for processing at least one repetition configuration information message received from a base station 105. For example, the beam management circuitry 290 may be configured to implement one or more of the functions described below in relation to FIG. 8. In some configurations, the beam management circuitry 290 may be separate from the controller/processor 240.

In some aspects of the disclosure, the controller/processor 280 may include beam management circuitry 292 configured for various functions, including, for example, for determining a configuration for performing repetition procedures, and for communicating configuration information that will be used by the UE 115 to configure the at least one antenna array for receiving (e.g., mmWave) communications from the serving cell. For example, the beam management circuitry 292 may be configured to implement one or more of the functions described below in relation to FIGS. 9 and/or 10

Figure 3:
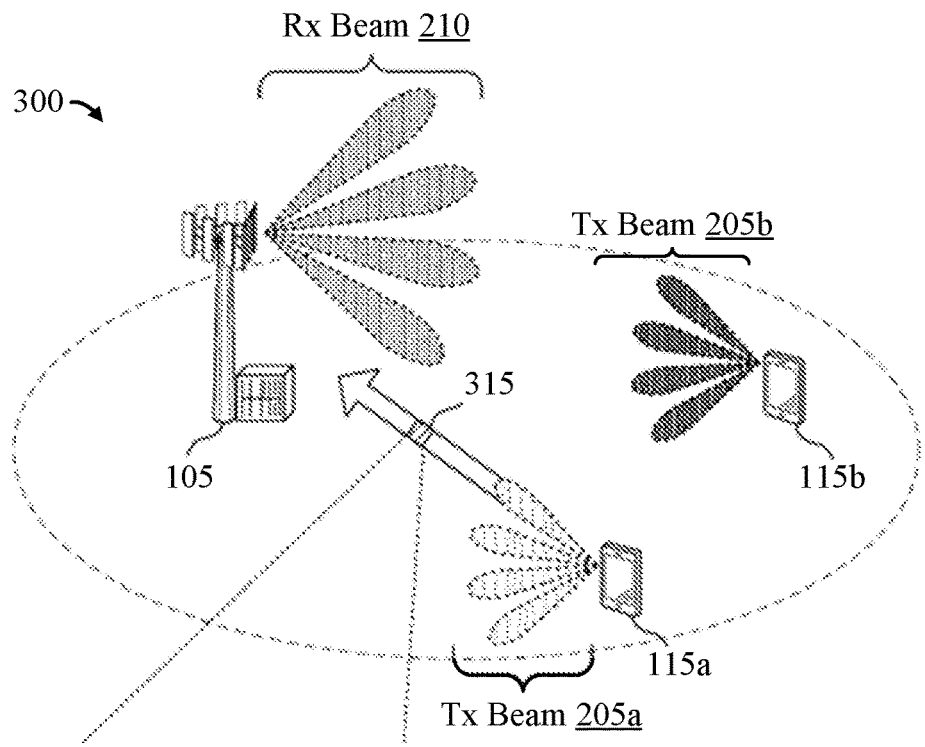
FIG. 3 illustrates an example of a wireless communications system that supports beamforming with multiple beams in accordance with various aspects of the present disclosure.

FIG. 3 illustrates an example of a wireless communications system 300 that supports beamforming with multiple beams in accordance with various aspects of the present disclosure. In some examples, wireless communications system 300 may implement aspects of wireless communications system 100. For example, wireless communications system 300 includes a base station 105, and multiple UEs, including UE 115a and UE 115b, which may be examples of UE 115 devices described with reference to FIG. 1.

Wireless communications system 300 may operate in frequency ranges that are associated with beamformed transmissions between base station 105 and UE 115a and/or UE 115b. For example, wireless communications system 300 may operate using mmWave frequency ranges. As a result, signal processing techniques, such as beamforming, may be used to coherently combine energy and overcome path losses. For example, base station 105 and the UEs (115a and/or 115b) may communicate via beam pair links BPLs, each BPL including, for example, a transmit beam (205a and 205b) of a UE 115 and a receive beam 210 of a base station 105. It is understood that the respective devices are capable of forming directional beams for transmission and reception, where base station 105 may also form one or more transmit beams for transmitting on the downlink, and the UEs 115 may form corresponding receive beams to receive signals from base station 105. In some cases, base station 105 may only have the capacity to utilize a single receive beam 210 at a time (e.g., during a TTI), and base station 105 may receive directional transmissions from UE 115a and UE 115b when monitoring the path of a transmit beam 205 (e.g., in a particular direction).

One or both of UE 115a and UE 115b may be capable of uplink transmissions to base station 105. Thus, the UEs 115 in wireless communications system 300 may perform uplink transmissions 315 to base station 105 via a transmit beam 205, which may be received using a corresponding receive beam 210 at base station 105. Corresponding receive beams may be defined as a receive beam 210 that is used to receive signals from a certain direction, where there may be a corresponding transmit beam (205a and/or 205b) used to transmit in that direction. Additionally, or alternatively, corresponding beams may refer to a transmit beam 205 and receive beam 210 using the same beamforming weights. There may also be correspondence between transmit beams and receive beams at the same device. For instance, base station 105 may receive a transmission (i.e., in a first direction) on a particular receive beam 210, and base station 105 may use the same beam path as the receive beam 210 to send downlink transmissions (i.e., in the first direction) on a corresponding transmit beam. The beamforming weights in such a scenario may be the same for both a receive beam 210 and a transmit beam at base station 105. The same correspondence may take place for transmit beams 205 and receive beams formed at UE 115a and UE 115b. In any case, an uplink transmission 315 may be sent on a set of uplink resources by UE 115a. Base station 105 may accordingly transmit downlink communications to the UEs 115 via downlink beams, which may include an uplink configuration, where the uplink configuration indicates the set of uplink resources for use by a UE 115.

Figure 4:
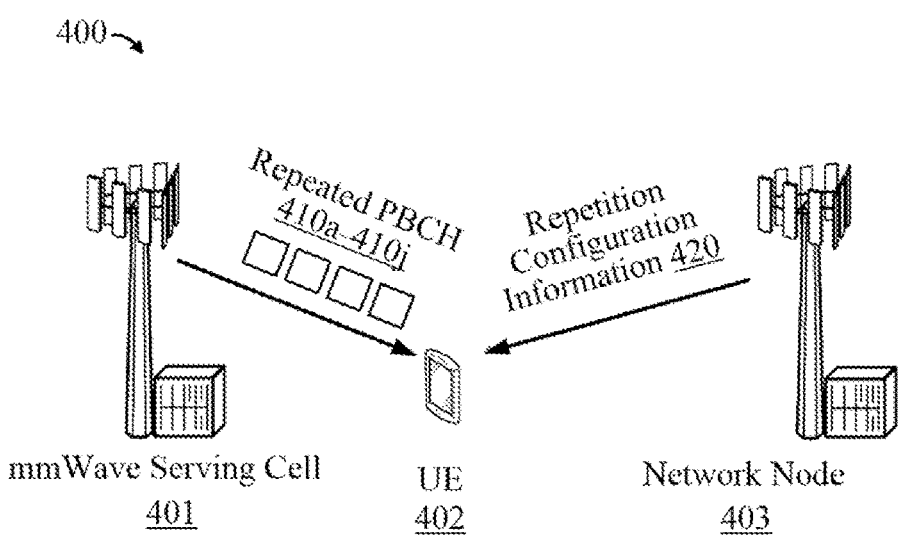
FIG. 4 illustrates a wireless communication system in accordance with aspects of the present disclosure comprising a first node, a second node, and a third node.

FIG. 4 is a wireless communication system 400 in accordance with aspects of the present disclosure comprising a first node, a second node, and a third node. In an exemplary embodiment, the first node is a serving cell 401, the second node is a UE 402, and the third node is a network node 403. The serving cell 401 operates at a higher mmWave frequency than the network node 403, which operates at a sub-6 GHZ frequency. Serving cell 401 and network node 403 may be the same node with the same identifier, or may be co-located cells, i.e., serving cell 401 is physically part of network node 403 but has a different cell identifier, or may be geographically separated cells. Serving cell 401 and network node 403 may be a small cell gNB and macro gNB, respectively, or alternatively, both may be small cell gNBs. In one embodiment, serving cell 401 and network node 403 may be communicating with each other directly, either through a wireless interface or a wired interface. In an alternative embodiment, serving cell 401 and network node 403 communicate with each other indirectly through another network node (not shown) or other core network component.

UE 402 can receive and decode transmissions from both the serving cell 401 and the network node 403 contemporaneously. UE 402 is configured with at least one antenna array for receiving mmWave communications and at least one omni-directional for receiving sub-6 GHz communications. Serving cell 401 broadcasts synchronization information in synchronization signal block (SSB) bursts in multiple beams in multiple directions. As part of the SSB transmissions, serving cell 401 transmits repetition versions 410a-410j of PBCH to UE 402 over at least one transmit beam.

More transmit beams are possible depending upon implementation choice. For descriptive purposes, the PBCH will be used as an exemplar in this disclosure, but the repetition configurations and procedures described in conjunction with PBCH are applicable for other control and data channels (e.g., physical downlink shared channel (PDSCH), physical multicast channel (PMCH), etc.), and the embodiments described herein should not be limited to PBCH.

Network node 403 transmits repetition configuration information 420 to the UE 402 prior to or while the UE 402 is receiving repetition versions 410a-410j of PBCH from serving cell 401. Repetition configuration information 420 is sent at a sub-6 GHz frequency to the UE 402. Since the repetition configuration information 420 is sent at a lower frequency, network node 403 may transmit repetition configuration information 420 in an omni-directional transmission. Since network node 403 is communicating with serving cell 401, any adjustments made to the repetition configuration by the serving cell 401 can be communicated to the network node 403, which can then update repetition configuration information 420 to the UE 402.

Accordingly, serving cell 401 repeatedly transmits contents of an original SSB signal to UE 402 so that UE 402 can use portions of the repeated content to supplement the original signal in the event UE 402 does not receive the original signal in its entirety. Moreover, UE 402 is provided at least one of: (i) a repetition number (e.g., a number of instances a portion of the original signal will be repeatedly transmitted), (ii) a time/frequency location per repetition, or (iii) QCL information across repetitions, prior to or during receiving repetition versions 410a-410j of PBCH from serving cell 401. Thus, UE 402 is no longer required to use blind decoding to receive and decode the original signal received on one beam and repetitions of the original signal on the same or another beam. This reduces processing time and power consumption that would otherwise be required to accommodate the computational complexity of various training and weighting algorithms involved in blind decoding.

In 5G, beam management of mmWave signals is envisioned to occur constantly during communications between a mmWave UE and the network. A portion of the beam management information may be passed from the serving cell 401 to the network node 403 to support a decision by the network node 403 to update the repetition configuration information 420. The network node 403 may determine to update and convey the repetition configuration information 420 whenever a first threshold value has been reached, which would be part of a dynamic updating process that is based on changing conditions at the serving cell 401. Or alternatively, the network node 403 may be configured to convey the repetition configuration information 420 periodically or at specific predetermined time instances that may be aperiodic.

Alternatively, the serving cell 401 may be configured to pass the repetition configuration information that it decides is appropriate to have conveyed to the UE 402 by the network node 403 at a predetermined point in time. As described herein, the repetition configuration information 420 sent to the UE 402 can be updated dynamically, periodically, or at certain predetermined times. The serving cell 401 and/or the network node 403 can be configured to take into account UE mobility and system resources (including UE resources such as time and frequency resources) to select an appropriate updating process.

In the embodiment of FIG. 4, the repetition configuration information may be generated by the serving cell 401 when the serving cell 401 determines to extend the range of transmit beams to the UE 401, or the serving cell 401 may have predetermined repetition configuration information that the serving cell 401 retrieves from a memory. Predetermined repetition configuration information may be generated by another node in the wireless communication system, such as a core network component (not shown) or network node 403, or generated by the UE 402 and communicated by the UE 402 whilst establishing communications with the serving cell 401 or during beam management message exchanges with the serving cell 401.

Figure 5:
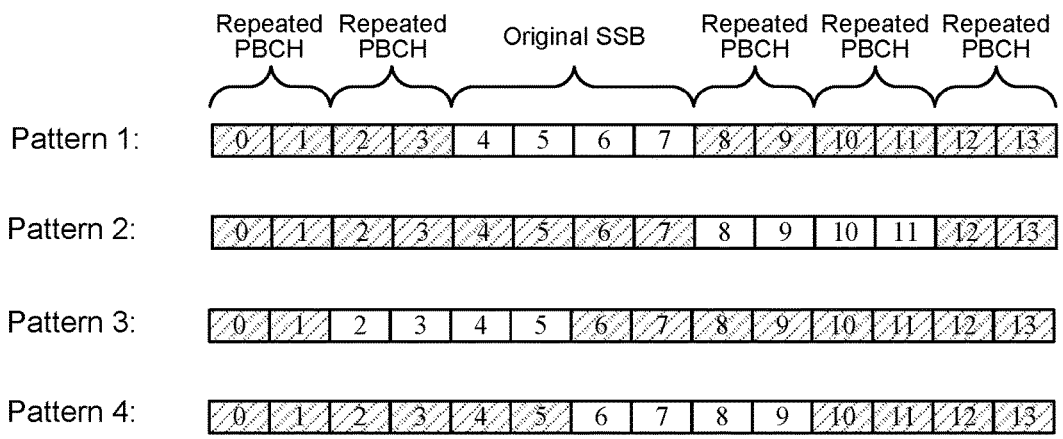
FIG. 5 illustrates possible repetition patterns that can be used by a serving cell to transmit five (5) repeated versions of an original physical broadcast channel (PBCH) to a UE in accordance with various aspects of the present disclosure.

FIG. 5 shows possible repetition patterns that can be used by a serving cell to transmit five (5) repeated versions of an original PBCH to a UE. The serving cell may inform a network node as to the repetition pattern identifier that is associated with a repetition pattern at a predetermined point of time and the network node may convey this repetition pattern identifier to the UE. Although alternative versions of five PBCH repetitions are shown in FIG. 5, it is envisioned that other multiples of repetitions may be used without departing from the scope of this disclosure.

Patterns 1, 2, 3, and 4 show a slot configuration that carries fourteen (14) symbols. In Pattern 1, the original SSB which contains the original PBCH is conveyed by symbols 4, 5, 6, and 7. A first repetition of PBCH is located at symbols 0 and 1. A second repetition of PBCH is located at symbols 2 and 3. A third repetition of PBCH is located at symbols 8 and 9. A fourth repetition of PBCH is located at symbols 10 and 11. A fifth repetition of PBCH is located at symbols 12 and 13.

In Pattern 2, the original SSB which contains the original PBCH is conveyed by symbols 8, 9, 10, and 11. A first repetition of PBCH is located at symbols 0 and 1. A second repetition of PBCH is located at symbols 2 and 3. A third repetition of PBCH is located at symbols 4 and 5. A fourth repetition of PBCH is located at symbols 6 and 7. A fifth repetition of PBCH is located at symbols 12 and 13.

In Pattern 3, the original SSB which contains the original PBCH is conveyed by symbols 2, 3, 4, and 5. A first repetition of PBCH is located at symbols 0 and 1. A second repetition of PBCH is located at symbols 6 and 7. A third repetition of PBCH is located at symbols 8 and 9. A fourth repetition of PBCH is located at symbols 10 and 11. A fifth repetition of PBCH is located at symbols 12 and 13.

In Pattern 4, the original SSB which contains the original PBCH is conveyed by symbols 6, 7, 8, and 9. A first repetition of PBCH is located at symbols 0 and 1. A second repetition of PBCH is located at symbols 2 and 3. A third repetition of PBCH is located at symbols 4 and 5. A fourth repetition of PBCH is located at symbols 10 and 11. A fifth repetition of PBCH is located at symbols 12 and 13.

In the repetition patterns of FIG. 5, the common rule for the patterns was to place repetitions on the two (2) symbols immediately before the SSB and two (2) symbols immediately after the SSB. Other repetition patterns and rules are possible depending on the selected number of repetitions supported by the serving cell.

The number of repetitions and the locations of the symbols that carry the repetitions may be directly communicated to a UE by a repetition pattern identifier as part of the repetition configuration information from a network node. However, alternative embodiments may be directed towards a repetition pattern identifier that identifies a repetition location offset to the SSB symbols being broadcast by the serving cell. In another alternative embodiment, the repetition pattern identifier may convey an indexed mapping, e.g., bitmap, indicating all symbol locations of all repetition patterns for which the serving cell may support. In another alternative embodiment, the repetition pattern identifier may provide a set of possible symbol locations per number of repetitions so that a UE will be performing a constrained number of blind decodings on the set of possible symbol locations rather than blind decoding of all possible symbol locations.

Figure 6:
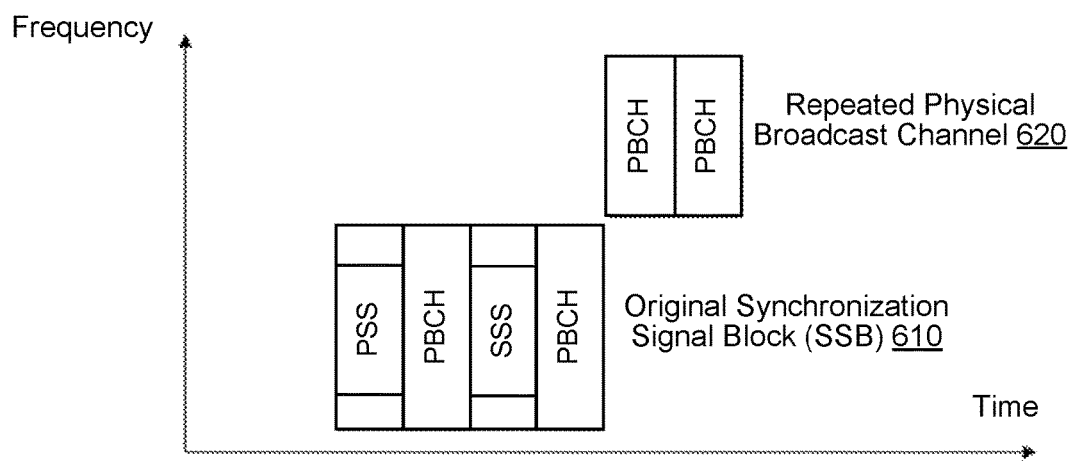
FIG. 6 illustrates an example of a frequency offset for a repetition version of a serving cell PBCH that can be part of the repetition configuration information transmitted to a UE from a network node in accordance with various aspects of the present disclosure.

FIG. 6 illustrates an example of a frequency offset for a repetition version of a serving cell PBCH that can be part of the repetition configuration information transmitted to a UE from a network node. For each repetition that is identified by the repetition configuration information, repetition configuration information can also carry the frequency location of each repetition. The frequency location per repetition can be varied in order to introduce more frequency diversity to the signals from the network node. In FIG. 6, an original SSB burst 610 carrying a PSS, PBCH, SSS and PBCH over four (4) symbols are sent in one frequency location. A subsequent PBCH repetition 620 are sent over two (2) symbols in a higher frequency range. The frequency location of the PBCH repetition 620 can be represented by an offset from the original signal and bandwidth, e.g., the PBCH repetition may be 2-tones above the original SSB with a 288-tone bandwidth.

In an alternative embodiment, the network node may provide a fixed mapping, e.g., bitmap, indicating the frequency locations of all repetition patterns for which the serving cell may support rather than providing repetition configuration information on a per update basis. In yet another embodiment, the network node may provide a mapping that indicates the frequency locations of subsets of the repetitions patterns for which the serving cell may support.

One type of payload information that could be useful to an UE is whether the payload is identical across repetition versions. Whether the payload is identical or not may trigger different soft combining behavior at the UE. Most incremental redundancy techniques involve soft combining, where copies of incorrectly received data are stored and are subsequently combined with other copies of the same received data to recreate a correct copy of the transmitted data. Principles of incremental redundancy are known in the art and a detailed discussion on incremental redundancy techniques will not be included in this disclosure.

Figure 7A:
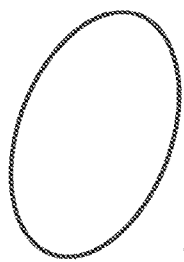
FIGS. 7A and 7B illustrate a series of paired transmit and receive beams at different repetition instances in accordance with various aspects of the present disclosure.
Figure 7A:
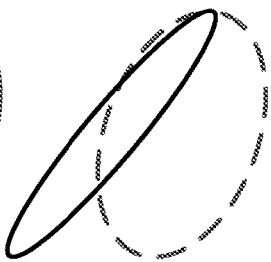
Figure 7A:
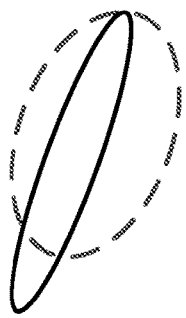
Figure 7A:
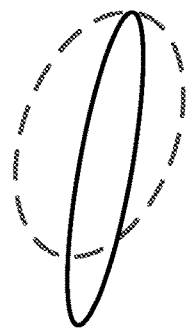
Figure 7A:
Figure 7A:
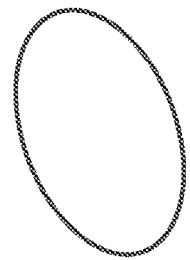
Figure 7A:
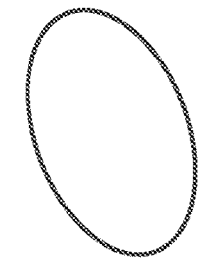
Figure 7A:
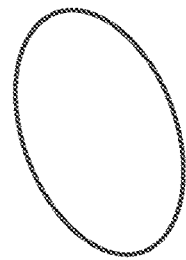
Figure 7B:
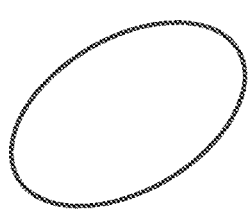
Figure 7B:
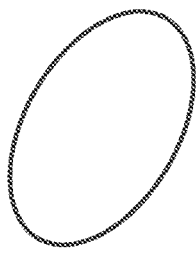
Figure 7B:
Figure 7B:
Figure 7B:
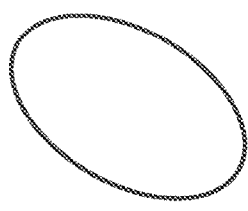
Figure 7B:
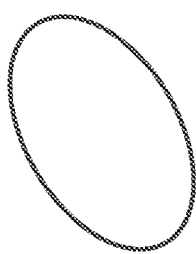
Figure 7B:
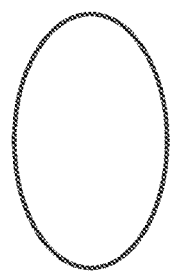
Figure 7B:
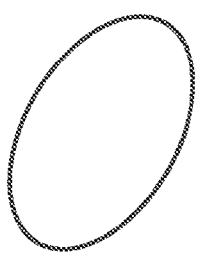

FIGS. 7A and 7B illustrate a series of paired transmit and receive beams at different repetition instances in accordance with different aspects of the present disclosure. As noted previously, 5G is envisioned to support multiple device types, including wireless devices that use multiple antennas or antenna arrays. FIGS. 7A and 7B show how QCL information may be used if it is included as part of the repetition configuration information transmitted to a UE. A network node can inform a UE that the repetitions to be sent by the serving cell are spatially quasi co-located with the original signal. In the embodiment illustrated by FIG. 7A, the UE can decide that due to the QCL nature of the repetitions, the UE does not need to adjust the receive beam that has a dominant arrival angle based on the original signal propagation path.

In FIG. 7A, a serving cell 401 and UE 402, as described in FIG. 4, has performed beam management procedures so that the serving cell 401 can send control and/or data signaling (i.e., an original signal) using transmit beam 710 to a UE 402 that receives the control and/or data signaling using receive beam 715. The orientation and strength of transmit and receive beams 710, 715 are determined by beam management procedures between the serving cell 401 and the UE 402. To a network node, the serving cell sends or has sent information indicative of the configurations that the serving cell will subsequently use for repetition transmissions to the UE. As a part of this information, the serving cell conveys QCL information that indicates that the repetitions will be spatially QCL to the original signal. The network node transmits this QCL information to the UE in a repetition configuration information message, which can be conveyed as an RRC message, MAC-CE, or L1 signaling, as examples. When the UE 402 receives this message, the UE 402 may decide to refrain from changing the current configuration of the receive beam 715 even though the serving cell may be changing the configuration of the transmit beam 710. Examples are shown for repetition 1 and 2.

For repetition 1, the transmit beam 720 from the serving cell is reconfigured to have a narrower and longer lobe than the original transmit beam 710 but whose dominant transmission angle is different from that of the original transmit beam 710. However, transmit beam 720 is still spatially QCL with the original transmit beam 710 since the dominant arrival angles of the transmit beams are within a tolerable range whereby they can be received by the same receive beam. Hence, the UE need not reconfigure the receive beam 725 to cover a different intended angular zone.

For repetition 2, the transmit beam 730 from the serving cell 401 is again reconfigured to have a narrower and longer lobe than the original transmit beam 710 but whose dominant transmission angle is different from that of the original transmit beam 710 and transmit beam 720. However, transmit beam 730 is still spatially QCL with the original transmit beam 710 since the dominant arrival angles are within a tolerable range where they can be received by the same receive beam. Hence, the UE need not reconfigure the receive beam 735. As shown by the other transmit/receive beams in FIG. 7A, if the transmit beams carrying the repetitions are QCL with the original signal, the computational burden of performing beam sweeping at the UE is lifted if the UE has notice as to the QCL nature of the repetitions.

FIG. 7B is an example of a UE 402 performing beam sweeping due to QCL information conveyed in a repetition configuration information message indicating that the repetition transmissions will not be QCL with the original signal. Serving cell sends control and/or data signaling using transmit beam 750 to a UE that receives the control and/or data signaling using receive beam 755. To a network node, the serving cell sends or has sent information indicative of the configurations that the serving cell will subsequently use for repetition transmissions to the UE. As a part of this information, the serving cell conveys QCL information that indicates that the repetitions will not be spatially QCL to the original signal. The network node transmits this QCL information to the UE in a repetition configuration information message, which can be conveyed as an RRC message, MAC-CE, or L1 signaling for example.

For repetition 1, the transmit beam 760 from the serving cell is reconfigured to have a dominant transmission angle different from that of the original transmit beam 750. The dominant arrival angles of transmit beam 760 and the original transmit beam 750 are not within a range to be received by the same receive beam. Hence, the UE should reconfigure the receive beam 765 to change the directional orientation of the receive beam 765 to one that is more likely to pair with transmit beam 760.

For repetition 2, the transmit beam 770 from the serving cell is reconfigured again to have a dominant transmission angle different from that of the original transmit beam 750 and the transmit beam 760. The dominant arrival angles of beams 770 and 760 are not within a tolerable range to be received by the same receive beam. Hence, the UE should reconfigure the receive beam 775 to change its directional orientation to one that is more likely to pair with transmit beam 770. As shown by the other transmit/receive beams in FIG. 7B, if the transmit beams carrying the repetitions are not QCL with the original signal or each other, the UE will be performing a beam sweeping operation with the receive beam.

In the example of FIG. 7A, the original signal and the repetition versions were conveyed by transmit beams that were formed with a mix of wide and narrow beam widths. The use of narrow transmit beams that are transmitted at different transmit angles provides for better Signal to Noise Ratio (SNR) properties that would enable faster decoding at the UE. In the contrasting example of FIG. 7B, the original signal and the repetitions were conveyed by wide transmit beams. Repetitions using wide transmit beams may permit more multiplexing of users per symbol in the case where the serving cell is performing analog beamforming. Moreover, if the repetitions have identical contents and channels, then the UE can use the phase differential between the transmit beams to estimate a carrier frequency offset that can be used to correct phase errors that arise over time from frequency errors. The serving cell has the ability to select a repetition configuration that may involve many factors such as the transmit beam shape, angle of arrival, the antenna ports used for the transmit beams, whether the transmit beams are spatially QCL or not, the number of repetitions, the symbol locations of the repetitions, the tones at which the repetitions are sent, the number of transmit beams, etc. Indeed, many different combinations of selections may be possible due to the mechanism of using a repetition configuration information message conveyed by a network node in support of a serving cell.

Alternatively, a selection by the serving cell may be conveyed in separate messages, for example, the QCL status of the repetitions may be conveyed by a QCL indicator separately from the number of repetitions or the repetition patterns. The QCL indicator may be applied to all repetitions or multiple QCL indicators may be generated, each applied to different subsets of repetition versions. Using different messaging to address different serving cell configurations may be efficient depending on whether a lower layer process or an upper layer process is involved. For example, use RRC messaging if an upper layer process is to be invoked to support a change to the repetition configuration or use L1 signaling if a lower layer process is to be invoked to support a change to the repetition configuration.

Figure 8:
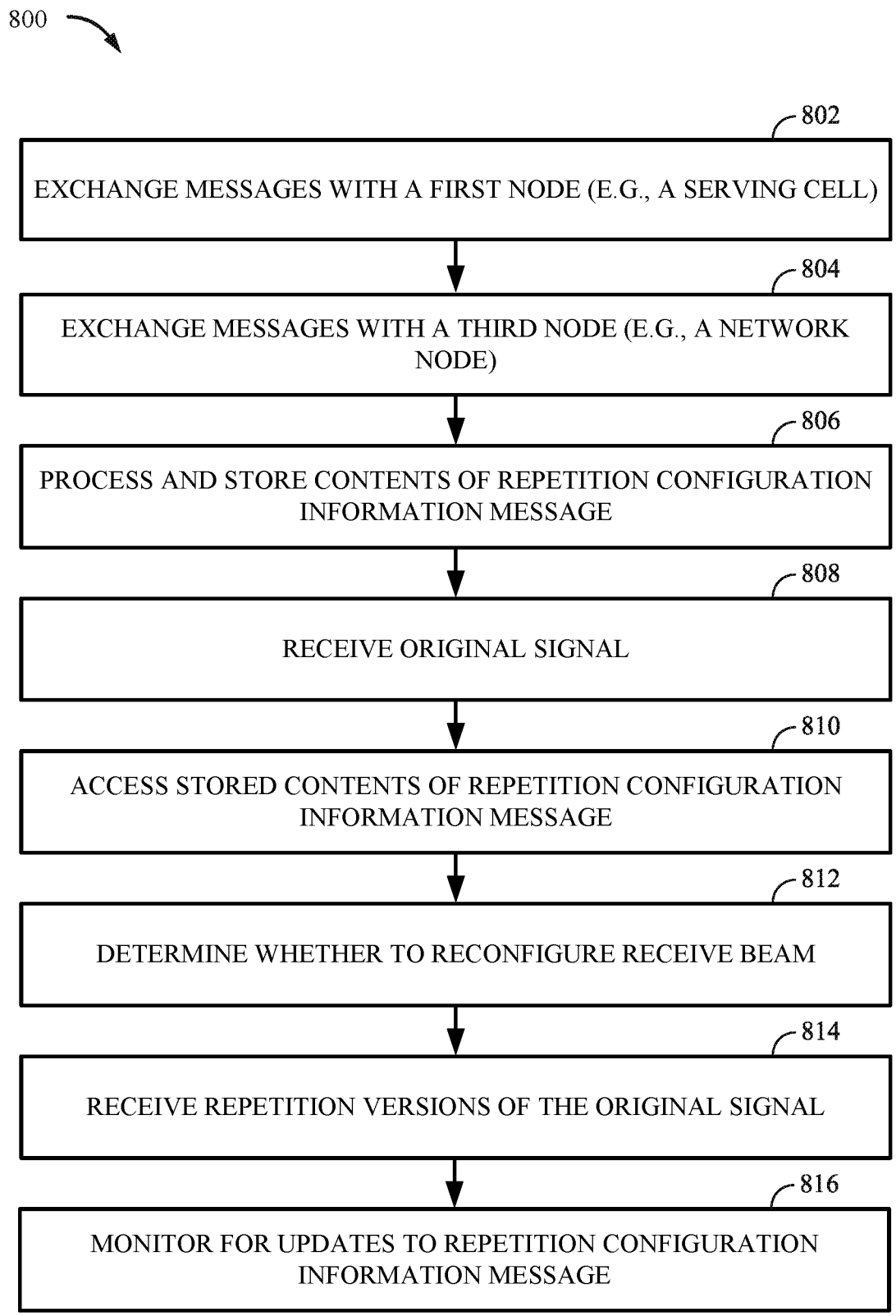
FIG. 8 is a flowchart for updating repetition configuration information at a UE in accordance with various aspects of the present disclosure.

FIG. 8 is a flowchart illustrating an exemplary method 800 for updating repetition configuration information at a UE. Although the description of FIG. 8 is in the context of a UE, the method can be performed at any type of node that can support wireless communications, such as at both mmWave and sub-6 GHz frequencies contemporaneously or simultaneously. The method 800 presumes that the UE has already established communication sessions with a serving cell and a network node.

At step 802, a UE processor controls internal processing of communications supporting the exchange of messages with a serving cell. The messages are for supporting beam management procedures. The UE processor may be a transmit processor, a receive processor, or a processor that is configured for both transmit and receive processing.

At step 804, the UE processor controls the internal processing of the transmissions supporting the exchange of messages with a network node. At least one of the messages is a repetition configuration information message from the network node. At optional step (not shown), the UE processor may control feedback transmissions such as an acknowledgement (ACK) or negative acknowledgment (NACK) to the network node. Communication of an ACK/NACK is a technique well-known to those of ordinary skill in the art, wherein the integrity of signal communication may be checked at the receiving side for accuracy, e.g., utilizing any suitable integrity checking mechanism, such as a checksum or a cyclic redundancy check (CRC). If the integrity of the signal is confirmed, an ACK may be transmitted, whereas if not confirmed, a NACK may be transmitted.

At step 806, within the UE processes and stores the contents of at least one repetition configuration information message in a memory. The contents of the repetition configuration information message will be used by the beam management circuitry to configure one or more antenna arrays to receive a transmit beam from the serving cell, such as at a mmWave frequency. The beam management circuitry may also be configured to support beam management procedures.

At step 808, the UE receives a first transmission instance of an original signal on a transmit beam from the serving cell. An example of the original signal is an SSB signal comprising a PBCH signal. Other types of signals such as data signals and control signals may also benefit from the embodiments described herein.

At step 810, the beam management circuitry accesses the stored contents of the repetition configuration information message from the memory and determines whether to reconfigure one or more antenna arrays to change a receive beam direction to maintain a pairing with the transmit beam from the serving cell.

At step 812, beam management circuitry determines whether to reconfigure or not reconfigure one or more of the antenna arrays in accordance to the received repetition configuration information message. In an alternative embodiment, the UE determines all reconfiguration actions before the first transmission instance of the signal.

At step 814, the UE processor receives repetition versions of the original signal through the receive beam and performs incremental redundancy techniques to recover information that was previously transmitted by the serving cell (e.g., information in the original signal).

Figure 9:
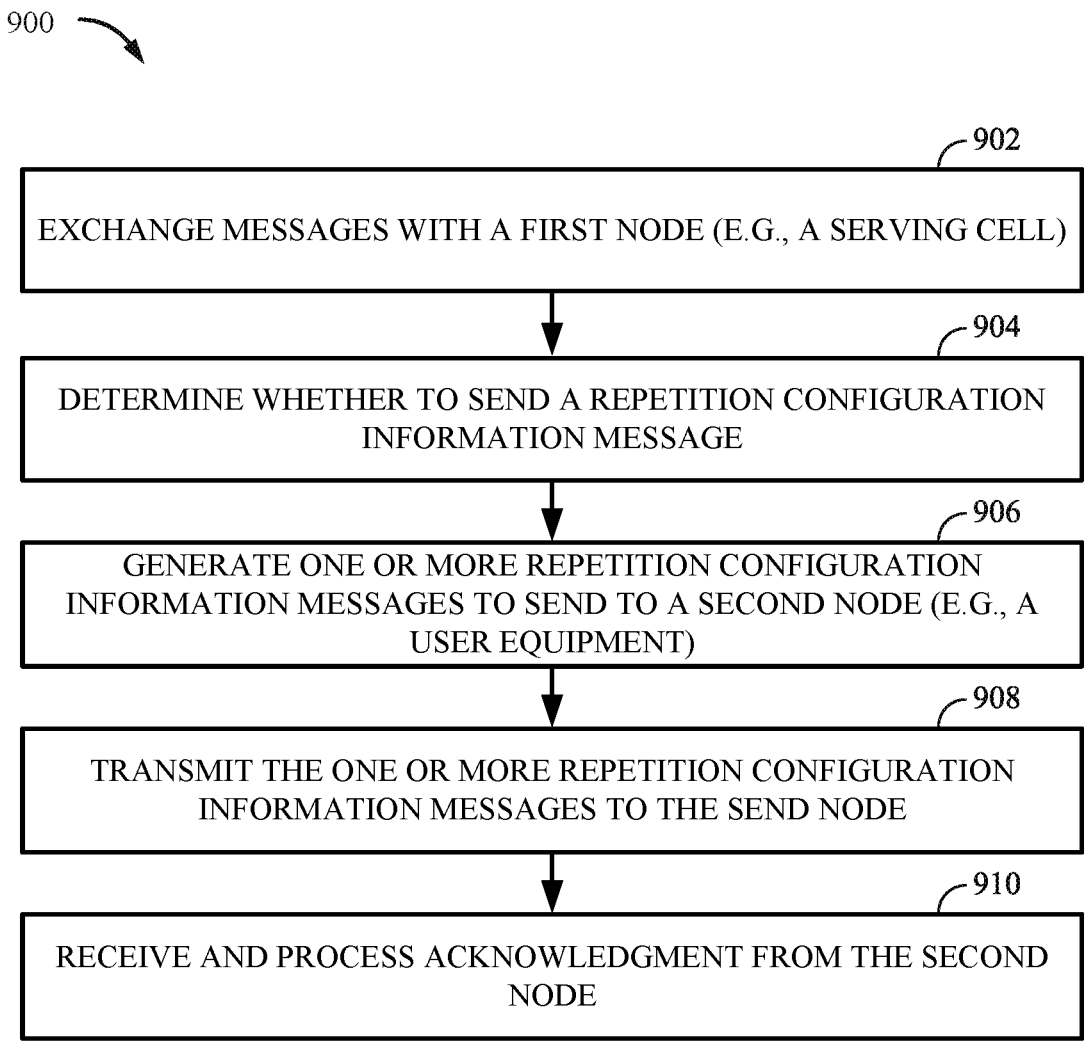
FIG. 9 is a flowchart for receiving repetition configuration information at a network node and transmitting the repetition configuration information to a UE in accordance with various aspects of the present disclosure.

At step 816, the UE continues to monitor for updates to the repetition configuration information message. In one aspect of this embodiment, steps 814 and 816 may occur contemporaneously FIG. 9 is a flowchart illustrating an exemplary method 900 for receiving repetition configuration information at a network node and transmitting the repetition configuration information to a wireless node, (e.g., a UE). Although the description of FIG. 9 is in the context of a network node, the method 900 can be performed at any type of node that can support wireless communications, such as at sub-6 GHz frequencies, and communications with another node in a wireless communication network, contemporaneously or simultaneously.

At step 902, a network node processor controls the internal processing of the transmissions supporting the exchange of network messages with a serving cell. The network messages are for supporting beam configuration updates to a UE that is being served by the serving cell. The exchange of network messages may be communicated wirelessly or over a wired medium.

At step 904, the network node processor determines whether to send a repetition configuration information message to the UE based on the contents of the exchanged network messages. The network node processor may be configured to assess the contents of the exchanged network messages to determine whether to generate and send a repetition configuration information message to the UE or the processor may be configured to not assess the contents of the exchanged network messages and to send the contents of the exchanged message in a repetition configuration information message without further determinations. The processor may be further configured to assess the contents of the exchanged network messages and select parameters indicative of the assessed contents. The selected parameters indicative of the assessed contents may be included as a portion of a repetition configuration information message to the UE.

At step 906, the network node processor generates at least one repetition configuration information message to the UE based at least in part on a portion of the repetition configuration information from the serving cell. The network node processor generates at least one repetition configuration information message in accordance with predetermined rules. One example of predetermined rule is to provide a fixed mapping format, e.g., bitmap, indicating the frequency locations of all repetition patterns for which the serving cell may be supporting. An alternative example is to provide a fixed mapping format indicting the frequency locations of subsets of the repetitions patterns for which the serving cell may be supporting. Another example of a predetermined rule is to provide the contents of the exchanged network message that are relevant to a particular instance in time. Another example of a predetermined rule is that some types of content, for example QCL information, is sent in a different type of messaging than other types of content, for example, the number of repetitions.

At step 908, the network node processor transmits at least one repetition configuration information message to the UE. The repetition configuration message comprises at least one of or a combination of: an indicator for a number of repetition versions in a slot; an indicator for symbol locations carrying a repetition version from the set of repetition versions; a payload indication; an indicator for frequency locations carrying a repetition version from the set of repetition versions; or at least one quasi co-located (QCL) information indicator.

At step 910, the network node processor may determine to forward a received acknowledgement from the UE or to inform the serving cell that the UE has acknowledged reception of the repetition configuration information message.

Figure 10:
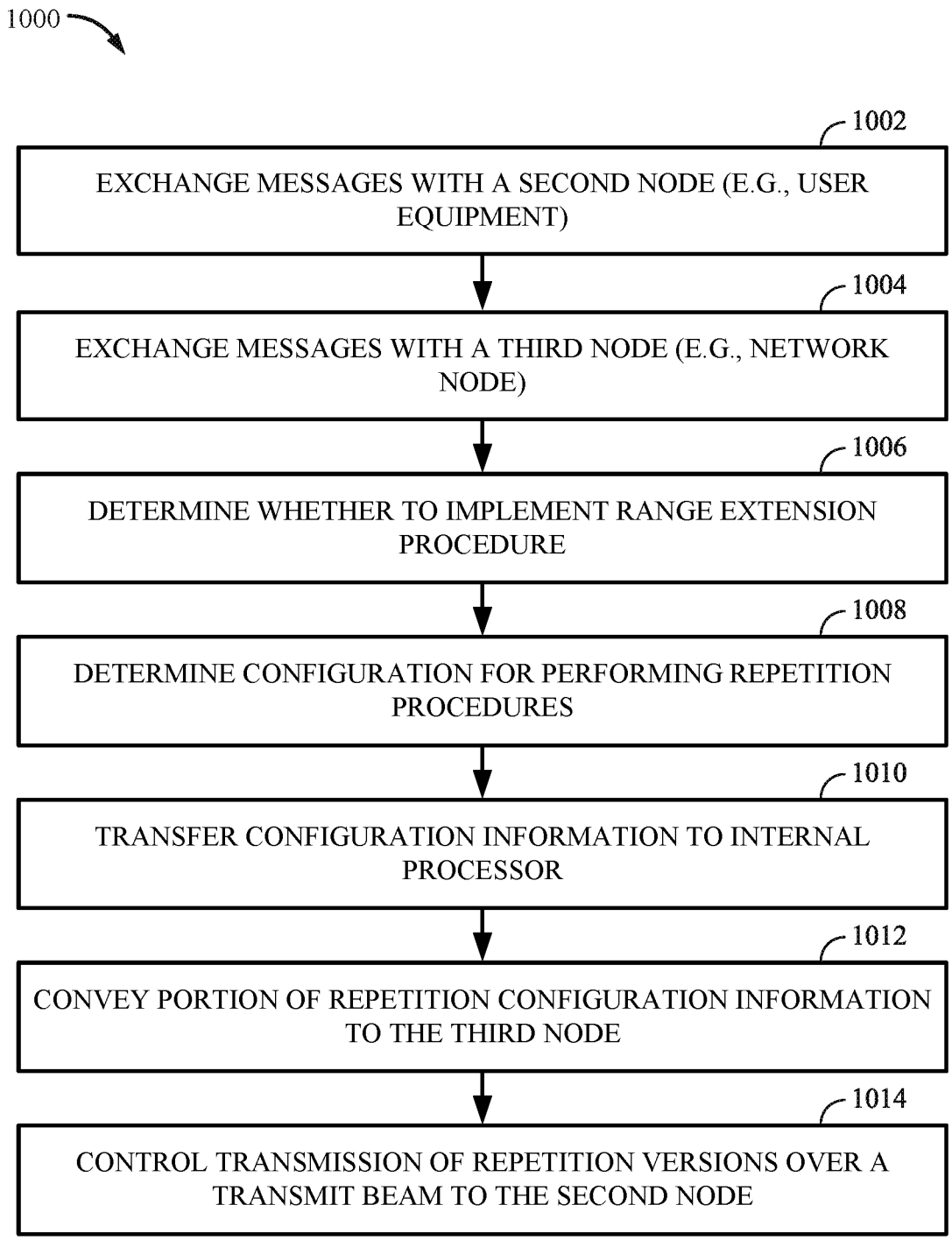
FIG. 10 is a flowchart for managing repetition transmissions at a serving cell in accordance with various aspects of the present disclosure.

FIG. 10 is a flowchart illustrating an exemplary method 1000 for managing repetition transmissions at a serving cell. Although the description of FIG. 10 is in the context of a serving cell, the method 1000 can be performed at any type of node that can support wireless communications, such as at mmWave frequencies, and communications with another node in a wireless communication network, contemporaneously or simultaneously.

At step 1002, a serving cell processor controls the internal processing of the transmissions supporting the exchange of messages with a UE. The messages are for supporting beam management procedures, such as at a mmWave frequency. The serving cell processor may be a transmit processor, a receive processor or a processor that is configured for both transmit and receive processing.

At step 1004, the serving cell processor controls the internal processing of the transmissions supporting the exchange of network messages with a network node. The exchange of network messages may be communicated wirelessly or over a wired medium. In one embodiment, steps 1002 and 1004 may occur contemporaneously.

At step 1006, beam management circuitry determines whether range extension techniques should be implemented to support communications with the UE. The determination can be based upon measured channel conditions, received channel condition reports, the receipt of information indicating that data is not being received at the UE, or other such parameters indicating a loss of channel quality. The beam management circuitry may be co-located within the serving cell processor or may be separate from the serving cell processor.

At step 1008, the beam management circuitry determines configuration information for performing repetition procedures to support range extension of transmissions from the serving cell. Configuration information may include at least one of the number of repetitions, the symbol locations for the repetitions, SFN information, repetition pattern information, payload information, QCL information (or other beam direction information), etc. for at least one transmit beam. In one embodiment, the beam management circuitry may determine that transmissions will be over multiple transmit beams, each having different transmit angles and each transmit beam carrying a subset of the repetition versions.

At step 1010, the beam management circuitry transfers the configuration information to the serving cell processor. The configuration information may have been processed by the beam management circuitry in a form that will directly inform the UE as to the appropriate UE receive beam configuration to pair with the transmit beam that will be carrying the repetitions or alternatively, the configuration information may be a reporting of the configuration settings used by the serving cell.

At step 1012, the serving cell processor exchanges network messages with the network node wherein at least one of the exchanged network messages conveys at least a portion of the repetition configuration information to the network node. Additionally, one of the exchanged network messages provides an indication that the UE has received the repetition configuration information, e.g., acknowledgment information.

At step 1014, the beam management circuitry controls the transmission of repetition versions over a transmit beam to the UE, wherein the transmit beam is configured in accordance to the repetition configuration information for a respective repetition version.

The descriptions in this disclosure provide examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means for transmitting and/or means for receiving may comprise one or more antennas, such as antenna(s) 234 of the gNB 105 and/or antenna(s) 252 of the user equipment 120. Additionally, means for transmitting may comprise one or more processors (e.g., Transmit Processors 220/264 and/or Receive Processors 238/258) configured to transmit/receive via the one or more antennas. Further, means for determining, means for deciding, means for using, and/or means for performing may comprise one or more processors, such as the Transmit Processor 220, the Receive Processor 238, or the Controller/Processor 240 of the gNB 105 and/or the Transmit Processor 264, the Receive Processor 258, or the Controller/Processor 280 of the user equipment 120.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the term receiver may refer to an RF receiver (e.g., of an RF front end) or an interface (e.g., of a processor) of a UE (e.g., UE 115) or BS (e.g., gNB 105) for receiving structures processed by an RF front end (e.g., via a bus). Similarly, the term transmitter may refer to an RF transmitter of an RF front end or an interface (e.g., of a processor) of a UE (e.g., UE 115) or BS (e.g., gNB 105) for outputting structures to an RF front end for transmission (e.g., via a bus). According to certain aspects, a receiver and transmitter may be configured to perform operations described herein.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for using information from a first wireless device to aid in reception of mmWave communications from a second wireless device, comprising:
    establishing communication sessions with the first wireless device and the second wireless device;
    performing a beam management procedure with the second wireless device;
    receiving at least one repetition configuration information message from the first wireless device;
    using contents of the at least one repetition configuration information message to configure one or more antenna arrays; and
    receiving transmissions from the second wireless device using the configured one or more antenna arrays.

2. The method of claim 1, further comprising sending an acknowledgment for successfully receiving the at least one repetition configuration information message.

3. The method of claim 1, further comprising:
    reviewing the received transmissions from the second wireless device for repetition versions; and
    when the repetition versions are found in the received transmission, combining the repetition versions to reconstruct an original signal.

4. The method of claim 3, wherein at least one repetition version of the repetition versions comprises a symbol pattern that is different from another repetition version of the repetition versions, and wherein the symbol pattern is characterized by a location of each symbol carrying a signal for a repetition version relative to another location of another symbol carrying a signal for the same repetition version.

5. The method of claim 1, wherein using contents of the at least one repetition configuration information message comprises:
    adjusting an arrival angle for a receive beam generated by the one or more antenna arrays.

6. The method of claim 1, further comprising:
    using the contents of the at least one repetition configuration information message to identify downlink resources that carry repetition versions of an original signal.

7. An apparatus configured to use information from a first wireless device to aid in reception of mmWave communications from a second wireless device, comprising:
    a memory; and
    a processor coupled to the memory, the memory and the processors configured to:
    establish communication sessions with the first wireless device and the second wireless device;
    perform a beam management procedure with the second wireless device;
    receive at least one repetition configuration information message from the first wireless device;
    use contents of the at least one repetition configuration information message to configure one or more antenna arrays; and
    receive transmissions from the second wireless device using the configured one or more antenna arrays.

8. The apparatus of claim 7, wherein the memory and the processors are further configured to send an acknowledgment for successfully receiving the at least one repetition configuration information message.

9. The apparatus of claim 7, wherein the memory and the processors are further configured to:
    review the received transmissions from the second wireless device for repetition versions; and
    when the repetition versions are found in the received transmission, combine the repetition versions to reconstruct an original signal.

10. The apparatus of claim 9, wherein at least one repetition version of the repetition versions comprises a symbol pattern that is different from another repetition version of the repetition versions, and wherein the symbol pattern is characterized by a location of each symbol carrying a signal for a repetition version relative to another location of another symbol carrying a signal for the same repetition version.

11. The apparatus of claim 7, wherein using contents of the at least one repetition configuration information message comprises:
    adjusting an arrival angle for a receive beam generated by the one or more antenna arrays.

12. The apparatus of claim 7, wherein the memory and the processors are further configured to:
    use the contents of the at least one repetition configuration information message to identify downlink resources that carry repetition versions of an original signal.

13. An apparatus configured to use information from a first wireless device to aid in reception of mmWave communications from a second wireless device, comprising:
    means for establishing communication sessions with the first wireless device and the second wireless device;
    means for performing a beam management procedure with the second wireless device;
    means for receiving at least one repetition configuration information message from the first wireless device;
    means for using contents of the at least one repetition configuration information message to configure one or more antenna arrays; and
    means for receiving transmissions from the second wireless device using the configured one or more antenna arrays.

14. The apparatus of claim 13, further comprising means for sending an acknowledgment for successfully receiving the at least one repetition configuration information message.

15. The apparatus of claim 13, further comprising:
    means for reviewing the received transmissions from the second wireless device for repetition versions; and
    when the repetition versions are found in the received transmission, means for combining the repetition versions to reconstruct an original signal.

16. The apparatus of claim 13, wherein using contents of the at least one repetition configuration information message comprises:
    means for adjusting an arrival angle for a receive beam generated by the one or more antenna arrays.

17. The apparatus of claim 13, further comprising:
    means for using the contents of the at least one repetition configuration information message to identify downlink resources that carry repetition versions of an original signal.

18. A non-transitory computer readable medium having instructions stored thereon which when executed by one or more processors causes an apparatus to perform a method, comprising:
    establishing communication sessions with a first wireless device and a second wireless device;
    performing a beam management procedure with the second wireless device;
    receiving at least one repetition configuration information message from the first wireless device;

using contents of the at least one repetition configuration information message to configure one or more antenna arrays; and receiving transmissions from the second wireless device using the configured one or more antenna arrays.

19. The non-transitory computer readable medium of claim 18, wherein the method further comprises sending an acknowledgment for successfully receiving the at least one repetition configuration information message.

20. The non-transitory computer readable medium of claim 18, wherein the method further comprises:

reviewing the received transmissions from the second wireless device for repetition versions; and when the repetition versions are found in the received transmission, combining the repetition versions to reconstruct an original signal.

21. The non-transitory computer readable medium of claim 18, wherein using contents of the at least one repetition configuration information message comprises:

adjusting an arrival angle for a receive beam generated by the one or more antenna arrays.

22. The non-transitory computer readable medium of claim 18, wherein the method further comprises using the contents of the at least one repetition configuration information message to identify downlink resources that carry repetition versions of an original signal.

* * * * *